United States Patent [19]
Grumm et al.

[11] Patent Number: 5,822,922
[45] Date of Patent: Oct. 20, 1998

[54] POWER DRIVE SYSTEM FOR MODULAR DUAL PANE REAR-MOUNTED WINDOW ASSEMBLY

[75] Inventors: Darren M. Grumm, Cassopolis; Roger E. Schamanek, Rochester Hills, both of Mich.; Todd E. Cripe, Goshen; Raymond S. Butler, Elkhart, both of Ind.

[73] Assignee: Excel Industries, Inc., Elkhart, Ind.

[21] Appl. No.: 757,355

[22] Filed: Nov. 27, 1996

Related U.S. Application Data

[63] Continuation-in-part of Ser. No. 624,130, Mar. 29, 1996, Pat. No. 5,724,769.

[51] Int. Cl.⁶ .................................................. E05F 11/00
[52] U.S. Cl. .................................................. 49/360; 49/380
[58] Field of Search ........................... 49/360, 361, 120, 49/121, 123, 369, 367, 368, 352, 380, 130, 413, 483.1, 489.1

[56] References Cited

U.S. PATENT DOCUMENTS 5,442,880  8/1995  Gipson ........................................ 49/413

Primary Examiner—Daniel P. Stodola
Assistant Examiner—Curtis Cohen
Attorney, Agent, or Firm—Banner & Witcoff Ltd.

[57] ABSTRACT

A modular sliding window assembly in a motor vehicle has two glazing panes, typically a sliding subassembly incorporating two vertically mounted transparent panes, which are slidably mounted in a circumferential frame slightly to the interior of, substantially parallel to and between two fixed panes. The sliding panes are mounted for sliding laterally back and forth between their open and closed positions. A motor and drive drum apparatus for powered operation of the window assembly is mounted to the vehicle body at a location remote from the frame. First and second cable fasteners are mounted to first and second sliding panes, respectively, and first and second cable guides are provided to guide a drive cable. The drive cable extends from the drive drum to the second cable fastener through the first cable guide, from the second cable fastener to the first cable fastener through the second cable guide, and from the first cable fastener to the drive drum through the first cable guide.

30 Claims, 9 Drawing Sheets

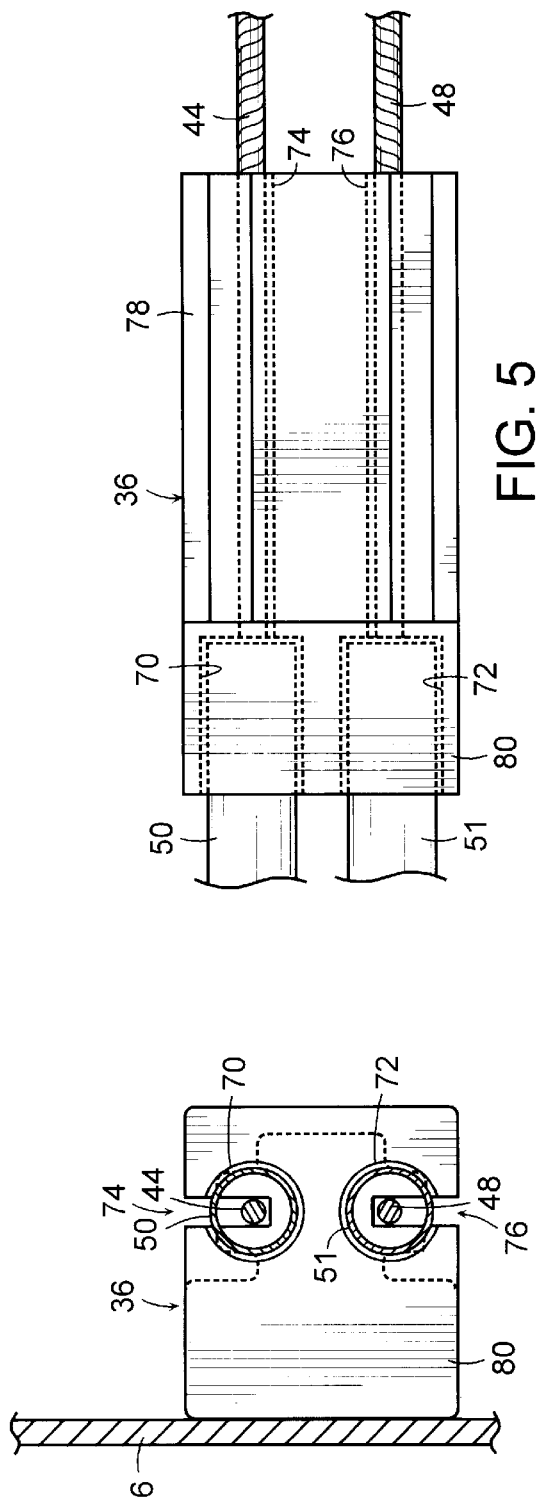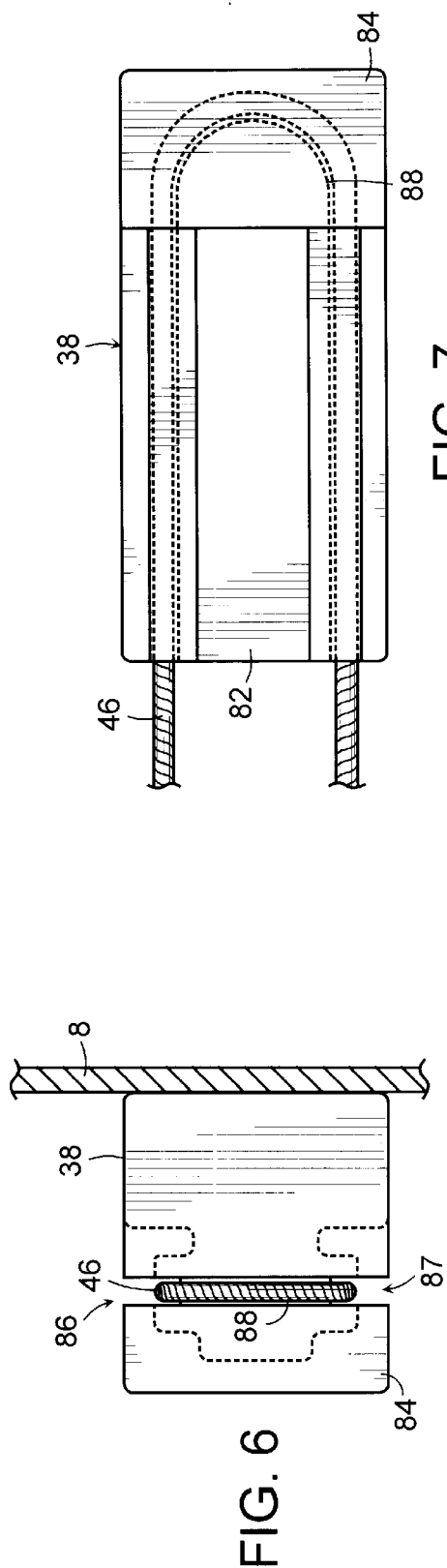

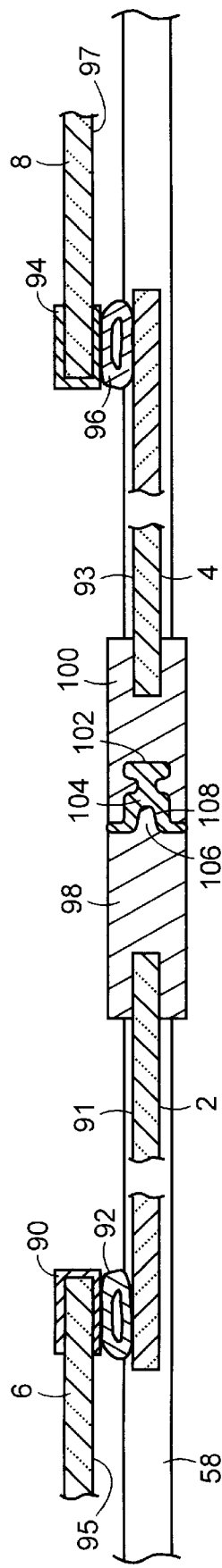

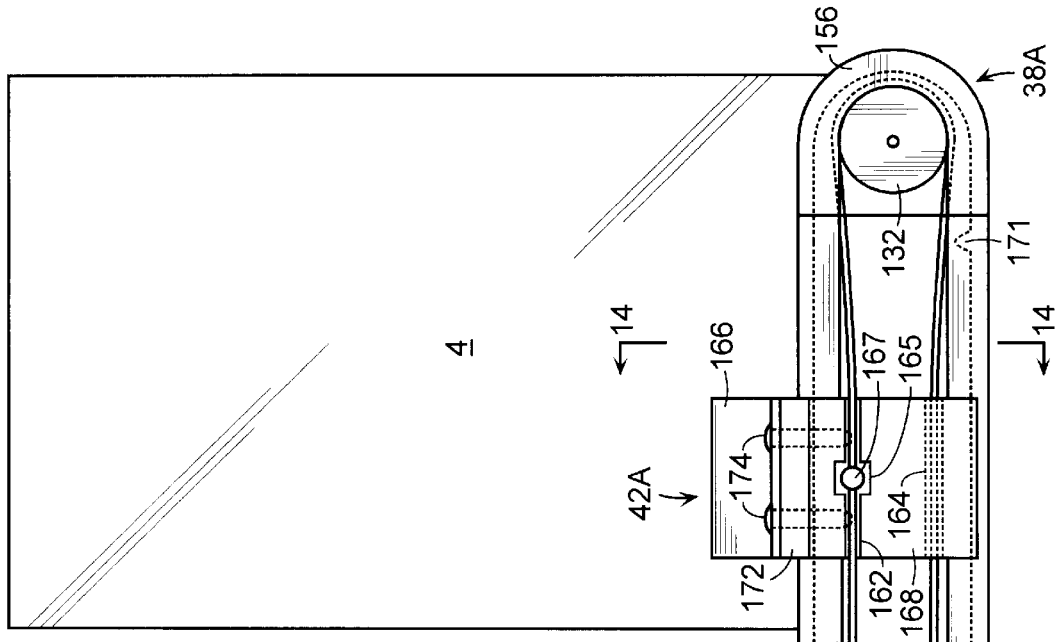
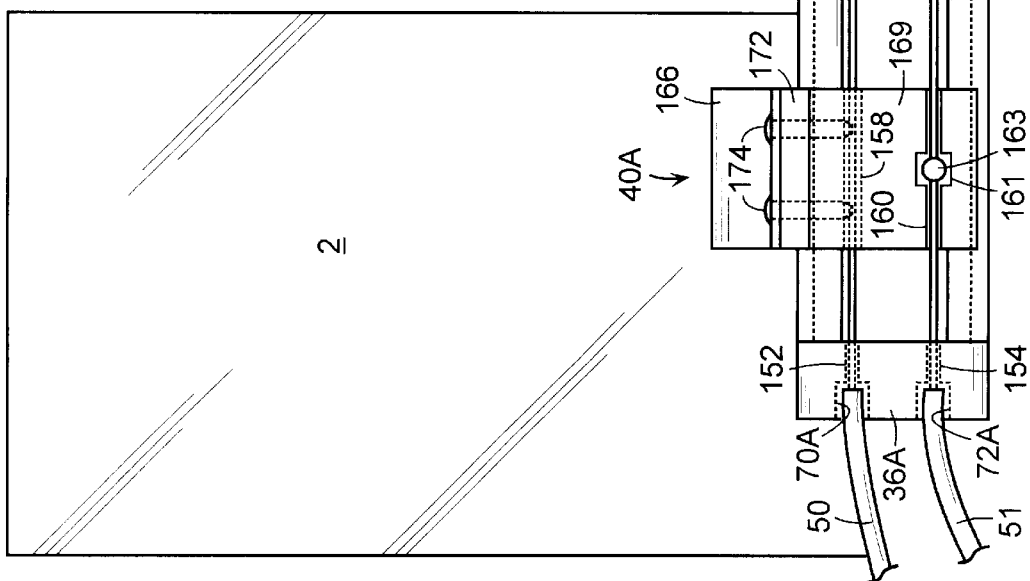
FIG. 13

POWER DRIVE SYSTEM FOR MODULAR DUAL PANE REAR-MOUNTED WINDOW ASSEMBLY

RELATED APPLICATION

This application is a continuation-in-part application of U.S. application Ser. No. 08/624,130 filed Mar. 29, 1996, now U.S. Pat. No. 5,724,769.

INTRODUCTION

The present invention is directed to a motor vehicle window assembly and, more particularly, to a modular window assembly in which two sliding panes are vertically mounted in a frame for sliding laterally back and forth between open and closed positions, operated by a remote powered drive apparatus.

BACKGROUND

Modular window assemblies for motor vehicles, having one or more laterally sliding panes, that is, panes which slide substantially horizontally in the vertical plane of the pane are used, for example, as rear slider windows for pickup truck cabs, and rear side windows. Such modular window assemblies typically have a circumferential (that is, outer peripheral) frame in which are mounted the sliding panes along with one or more fixed-position panes. The frame may be structural or semi-structural in that it integrates the sliding pane and one or more fixed-position panes as a self-contained preassembled module suitable for shipping and handling during installation into the motor vehicle.

A window assembly for a vehicle having a sliding pane is shown in U.S. Pat. No. 4,850,139 to Tiesler. In the Tiesler design the sliding window is manually operated. No power drive mechanism is suggested. Window assemblies with two manually operated sliding panes are also known in the industry. Preassembled multi-pane window constructions are shown in U.S. Pat. No. 4,920,698 to Friese et al. The Friese et al. window assemblies are replacements for the OEM (original equipment manufacturer) rear slider window assembly originally included in a vehicle when it was new. The Friese et al. window assembly includes right side and left side fixed panes and a sliding center pane powered by an electric motor. The powered sliding truck cab window assembly of Friese et al. has an undesirably complex mechanism for delivering drive power from an electric motor for moving the sliding pane between its open and closed positions. It shows, for example, a rack and pinion gear arrangement and, as an alternative, a push/pull drive cable arrangement also is shown. An interior cable cooperates with an outer sheath to drive the sliding pane through the intermediary action of a transmission mechanism which retracts or pushes out the interior cable upon actuation by the drive motor. Such push-pull cable arrangements present limitations as to the force which can be transmitted without buckling the cable. Also, such complex drive arrangements for sliding windows may in certain applications present reliability concerns and increased manufacturing, installation and repair costs. It would be highly desirable for meeting increasingly stringent OEM requirements of the major motor vehicle manufacturers to have a reliable, less complex drive system for a powered sliding window assembly.

Designs for motor driven window constructions for a motor vehicle must select an appropriate location for mounting the electric motor and drive drum apparatus to the vehicle body. Present designs typically locate the electric motor proximate the window frame. It is now seen to be advantageous to mount the electric motor and drive drum apparatus, with its relatively high mass and rigidity, at a lower location in the vehicle body. It would be advantageous to have design flexibility for mounting the motor and drive drum at a remote location in the vehicle body, i.e., remote from the window, such as below the vehicle occupant seating level, so as to reduce the likelihood of contact between the vehicle occupant and the motor in the event of dislocation.

It is an object of the present invention to provide motor vehicle window constructions having improved pull-pull cable drives for powered, laterally slidably panes. Additional objects and optional features of the invention will be apparent from the following disclosure and detailed discussion of preferred embodiments.

SUMMARY

In accordance with a first aspect a motor vehicle powered window assembly has glazing panes, typically a slider subassembly incorporating two transparent panes, which are slidably mounted in a circumferential frame. The slider subassembly is mounted for sliding the panes laterally back and forth between their open positions and closed positions. A drive member operatively connects the slider subassembly to a drive subassembly for powered operation, that is, for moving the slider subassembly laterally back and forth between its open and closed positions.

In accordance with another aspect the drive subassembly includes an electric motor and a drive drum operatively engaging the output member of the motor. The drive drum and motor apparatus are mounted to the vehicle body at a location remote from the window frame. The drive member is formed of a drive cable wrapped around the drive drum which interconnects the remotely mounted drive apparatus to the slider subassembly. Rotation of the remotely mounted drive drum in a first direction pulls the sliding panes of the slider assembly via the drive cable toward their open positions, while rotation of the drive drum in the opposite rotational direction pulls the sliding panes via the drive cable toward their closed positions. Thus, the slider subassembly is moved by a cable pull operation in both directions, the slider subassembly and drive cable together forming a closed loop from the drive drum.

In accordance with another aspect left and right cable fasteners are attached to the sliding panes, and left and right cable guides are provided to properly position the drive cable. The drive cable extends from the drive drum to the right cable fastener through the left cable guide, from the right cable fastener to the left cable fastener through the right cable guide, and from the left cable fastener back to the drive drum through the left cable guide.

The pull-pull cable arrangement disclosed here, wherein the drive cable pulls the slider subassembly or so-called sliding panes in substantially the direction of travel, both when the window is being pulled open and when it is being pulled closed, provides excellent performance reliability and smoothness of operation. In addition, substantial advantage is achieved by mounting the electric motor and drive drum apparatus remote from the slider and window frame assembly. In particular, significant design flexibility is achieved in selecting the mounting location for the motor and drive drum apparatus. Since this apparatus typically has relatively high mass and rigidity, it can be advantageously mounted in accordance with the disclosure here, at a location where it is less likely to contact a vehicle occupant in the event of dislocation. Suitable cable guides, such as fixed surface and/or pulley-type cable guides can be provided to guide the drive cable in its travel path between the remotely located motor and drive drum apparatus and the sliding panes. Accordingly, both enhanced design flexibility and excellent power window operation can be achieved.

In accordance with another aspect, a method is provided for retrofitting a manual-slide window assembly in a motor vehicle body. That is, in a window assembly having two manually slidably panes mounted in a circumferential frame between two fixed panes, a pull-pull cable drive substantially as described above can be installed along with a remotely located electric motor and drive drum apparatus. Left and right cable fasteners are attached to the sliding panes, and left and right cable guides are provided to properly position the drive cable. The electric motor and drive drum apparatus are mounted to the motor vehicle remote from the frame and sliding panes. A drive cable is mounted, the drive cable extending from the drive drum to the left side of the right cable fastener through the left cable guide, from the right side of the right cable fastener to the right side of the left cable fastener through the right cable guide, and from the left side of the left cable fastener to the drive drum through the left cable guide. The manual-slide window construction is thereby retrofitted to operate as a pull-pull powered slider window construction wherein the cable guides, cable fasteners and drive cable together form a closed loop from the remotely mounted drive drum and electric motor apparatus. In accordance with certain preferred embodiments the left and right cable guides and fasteners are adhesively attached to the inside surface of the fixed and sliding panes, respectively.

From the foregoing disclosure, it will be readily apparent to those skilled in the art, that is, to those who are knowledgeable or experienced in this area of technology, that the present invention provides a significant technological advance. The window assembly disclosed here is well-suited to applications involving original motor vehicle installations and to applications involving retrofitting of a rear slider window assembly installed originally with manual-slide type windows. These and additional features and advantages of the invention disclosed here will be further understood from the following detailed disclosure of certain preferred embodiments.

BRIEF DESCRIPTION OF THE DRAWINGS

Certain preferred embodiments are described in detail below with reference to the appended drawings wherein:

FIG. 4 is a schematic section view, taken along line 4—4 of FIG. 1, showing the left cable guide;

FIG. 5 is a schematic elevation view of the left cable guide of FIG. 1;

FIG. 6 is a schematic section view, taken through line 6—6 of FIG. 1, showing the right cable guide;

FIG. 7 is a schematic elevation view of the right cable guide of FIG. 1;

FIG. 8 is an enlarged section view showing the relative positioning of the fixed-position panes of the window assembly of FIG. 1, together with the sliding panes in their closed positions, along with selected other componentry of the modular sliding window assembly;

FIG. 9 is an enlarged partial schematic section view of an alternative embodiment of the sealing flange and associated components of FIG. 8;

FIG. 10 is a schematic section view of an alternative embodiment showing the drive cable directly bonded to a sliding pane;

FIG. 13 is a partial schematic elevation view of an alternative embodiment of the cable fasteners and cable guides of FIG. 1;

Figure 1:
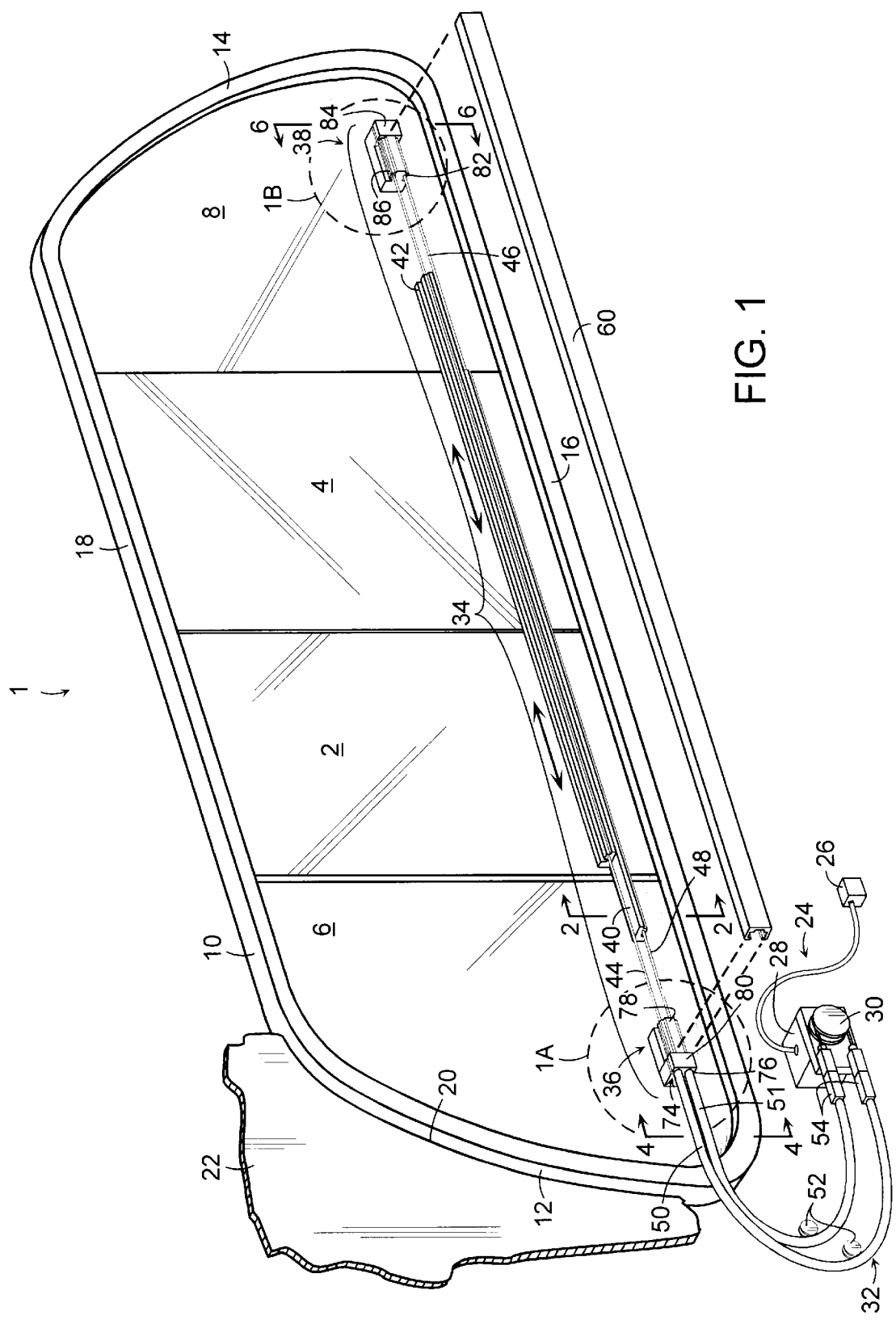
FIG. 1 is an interior schematic perspective view of a multi-pane modular sliding window assembly, shown partially assembled, vertically mounted as a rear slider window in a pickup truck cab or the like, incorporating two sliding panes mounted within a frame between right and left side fixed-position panes, a pull-pull drive cable arrangement, and a motor with drive drum apparatus remotely mounted to a motor vehicle body in accordance with a first preferred embodiment.

The figures referred to above are not drawn necessarily to scale and should be understood to present a simplified representation of the invention, illustrative of the basic principles involved. Some features of the window assembly depicted in the drawings have been enlarged or distorted relative to others to facilitate explanation and understanding. The same reference numbers are used in the drawings for similar or identical components and features shown in various alternative embodiments. Window assemblies incorporating sliding panes as disclosed above, will have configurations and components determined, in part, by the intended application and use environment.

DETAILED DESCRIPTION OF CERTAIN PREFERRED EMBODIMENTS

Unless otherwise stated, or otherwise clear from the context below, directional references used here are based on the orientation of components and assemblies shown in the appended drawings. These directional references assume a window assembly mounted as the rear window in the cab or passenger compartment of a motor vehicle, such as a pickup truck or the like. Thus, an interior surface of the window faces into the passenger compartment. An exterior surface faces rearward of the vehicle. The lateral directions are right and left as one faces from the front to the back of the vehicle. The sliding panes in window assemblies disclosed here are laterally slidable in the sense that they slide horizontally and substantially left and right in the plane of the slider pane. Reference to an inside surface of a window pane is intended to mean that surface which faces into the vehicle passenger compartment. The following detailed description of certain preferred embodiments will focus on window assemblies adapted for use as a rear slider in a pickup truck cab. Those skilled in the art will recognize from this disclosure, however, that alternative applications are possible, such as motor vehicle side windows calling for two sliding panes mounted within a frame for lateral sliding between their open and closed positions. In a side window application, such lateral sliding typically would involve fore-and-aft travel of the sliding panes relative to the vehicle body.

In the following embodiments, the components on a first side of the vehicle have arbitrarily been chosen as the left side, and the components on the second side of the vehicle have been chosen as the right side. In practice the components can be arranged in any manner which is appropriate given the environment and intended use of the principles of the invention.

The window assembly 1, schematically illustrated in FIG. 1, is a rear slider in a pickup truck cab, having left and right sliding panes 2, 4, respectively, positioned slightly to the interior of and substantially parallel to right side and left side fixed-position panes 6, 8 respectively. The sliding pane and fixed position panes are mounted in a circumferential frame 10 having substantially vertical left and right portions 12, 14, respectively, interconnected by substantially horizontal lower and upper frame portions 16, 18, respectively. The window assembly 1 is seated in a window opening 20 defined by vehicle body 22 at the rear of the passenger compartment. Thus, window assembly 1 is oriented in a generally vertical plane. Frame 10 is said to be circumferential in the sense that it forms a complete or substantially complete perimeter around the sliding panes 2, 4. Preferably the frame integrates the window assembly, such that the window assembly is structural or semi-structural in the sense that it is sufficiently self-supporting as a preassembled self-contained module, to withstand stresses placed upon it during shipping, handling and installation into the motor vehicle window opening.

In accordance with current design preferences, the circumferential frame preferably includes at least one unitary full-circumference member extending all the way around the perimeter. Such full-circumference member can be formed by injection molding in-place around the fixed-position panes employing suitable plastics such as, for example, Geloy® which is commercially available from General Electric Company. Sliding travel channels for guiding the sliding pane in its lateral movement between the open and closed positions can be molded into the frame and/or formed in whole or in part by separately attached channel members formed of metal, plastic, etc. The frame may further comprise appliques and the like to provide decorative "show" surfaces, that is, surfaces which will be exposed to view during normal use of the window assembly when it is installed in the motor vehicle window opening. It will be within the ability of those skilled in the art, given the benefit of the present disclosure, to design and construct frames suitable to specific applications.

Window assembly 1 of FIG. 1 further comprises a pull-pull cable drive subassembly 24 for powering the sliding panes between their opened and closed positions. Switch 26 for selectively actuating electric motor 28 is connected to the vehicle battery or other power source. Switch 26 can be mounted at any convenient location for use by vehicle occupants, for example on the dashboard or on the driver's side door. A drive drum 30 is operatively engaged to an output member of motor 28, preferably being directly mounted onto a rotating output shaft of the motor. Drive cable 32 extends from drive drum 30 to cable housing 34 which is operatively connected to sliding panes 2, 4. In a preferred embodiment cable housing 34, shown partially assembled, is mounted to window assembly 1 proximate frame portion 16. It is to be appreciated that cable housing 34 may in another embodiment be enclosed within frame portion 16 so as to be hidden from view.

Cable housing 34 comprises left cable guide 36 secured to left fixed pane 6, preferably by an adhesive or epoxy, proximate a lower edge thereof. Right cable guide 38 is similarly secured to right fixed pane 8 proximate a lower edge thereof. Left cable fastener 40 is secured in like fashion to sliding pane 2 proximate a lower edge thereof, and right cable fastener 42 is secured in like fashion to sliding pane 4 proximate a lower edge thereof, but at a position slightly higher than the position at which left cable fastener 40 is secured to left sliding pane 2. Positioning right cable fastener 42 slightly higher than left cable fastener 40 ensures that drive cable 32 can operate freely without obstruction from either cable fastener. It is to be appreciated that although cable fasteners 42, 40 are fastened to sliding panes 4 and 2, respectively, they extend beyond the left and right edges of the sliding pane they are fastened to. Other suitable means of constructing left and right cable fasteners 40, 42 to fasten drive cable 32 to the sliding panes 2, and 4 will be readily apparent to those skilled in the art, that is those with knowledge or experience in this field of technology, given the benefit of the present disclosure.

First exterior segment 44 of drive cable 32, extending from drive drum 30, passes through left cable guide 36 and is secured to the left side of right cable fastener 42. Interior segment 46 of drive cable 32 is secured to the right side of right cable fastener 42 and passes through right cable guide 38, returning and being secured to the right side of left cable fastener 40. Second exterior segment 48 is secured to the left side of left cable fastener 40 and passes through left cable guide 36 to drive drum 30.

Channel 60, shown in a non-assembled condition, is substantially C-shaped having the open side of its C-shape facing window assembly 1. Left cable fastener 40 and right cable fastener 42 have corresponding profiles which allow them to nest within the mouth of channel 60 such that they are at least partially contained within channel 60 and are free to slide laterally to the left and right along channel 60. Left and right cable guides 36, 38 also have profiles along a portion of their respective lengths to allow them to nest within respective ends of channel 60, thereby acting as end caps for channel 60. Further description of the cable fasteners and cable guides follows below.

In operation, when drive drum 30 rotates in a clockwise direction, second exterior segment 48 is wrapped around drive drum 30 and first exterior segment 44 is unwrapped from drive drum 30. Second exterior segment thereby pulls left cable fastener 40 and, correspondingly, pulls left sliding pane 2 to the left towards its open position, while interior cable segment 46 in turn pulls right cable fastener 42 and thereby pulls right sliding pane 4 to the right towards its open position. When drive drum 30 is rotated in the opposite, or counterclockwise direction, first exterior segment 44 pulls right cable fastener 42 and thereby pulls right sliding pane 4 to the left toward its closed position, while interior segment 46 pulls left cable fastener 40, thereby pulling left sliding pane 2 to the right towards its closed position.

Preferably cable segments 44 and 48 have an outer sheath or conduit 50, 51, respectively, over at least a portion of their length. In accordance with certain highly preferred embodiments, the first and second exterior segments 44, 48 of drive cable 32 are attached to the left cable guide 36 by securing corresponding first ends of conduit 50, 51 thereto.

It will be within the ability of those skilled in the art, given the benefit of the present disclosure, to employ suitable cable guide means, such as guides 52 shown in FIG. 1, for mounting and guiding the travel path of the drive cable from the remotely mounted motor 28 and drive drum 30 to the window frame assembly. Also, tensioning means 54 can be provided, for example standard threaded fittings or turnbuckles, positioned at second ends of conduit 50, 51, proximate drive drum 30. Exterior segments 44, 48 of drive cable 32 are thus free of conduit 50, 51 as they are wrapped around drive drum 30. Tensioning means 54 provides for adjustment of the position of the sliding panes to ensure that they are centered within the frame 10 and to take up any slack that may develop in the drive cable 32.

Figure 2:
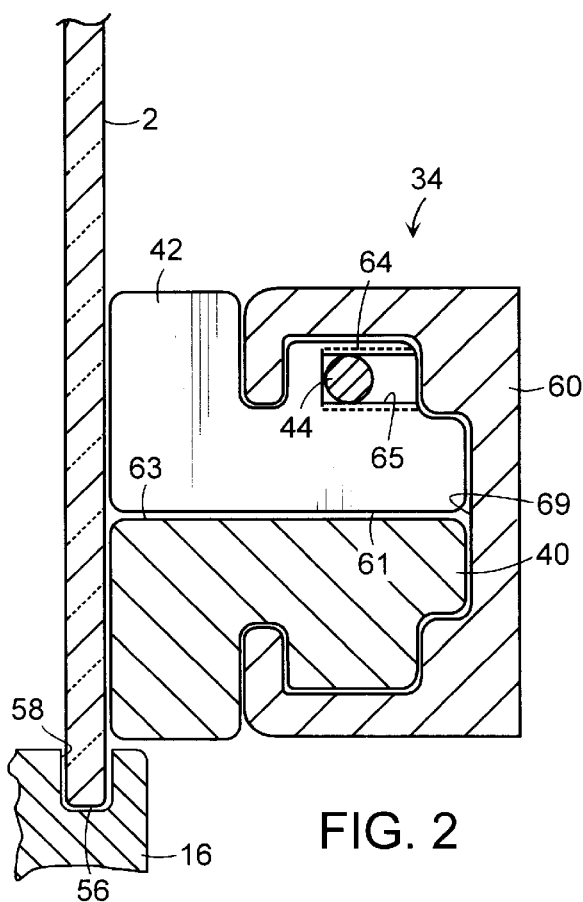
FIG. 2 is a section view taken through line 2—2 of FIG. 1, showing cable fasteners matingly engaged in a channel.

As can be seen in FIG. 2, lower edge 56 of sliding pane 2 preferably travels in slot 58 formed in and extending laterally along lower frame portion 16. Sliding pane 4 travels in slot 58 in a similar fashion. A corresponding slot (not shown) is formed in upper frame portion 18 to guide upper edges of sliding panes 2 and 4 in a like manner. Left cable fastener 40 is secured to left sliding pane 2 proximate lower edge 56 just above frame portion 16. As described above, right cable fastener 42 is secured to right sliding pane 4 just above left cable fastener 40 so that the cable fasteners do not interfere with the path of travel of first exterior segment 44 and interior segment 46 of drive cable 32. Left and right cable fasteners 40, 42 travel within recess 69, formed by channel 60, laterally to the left and right, thereby pulling corresponding sliding panes 2, 4 between their opened and closed positions. Lower surface 61 of right cable fastener 42 is supported on upper surface 63 of left cable fastener 40 as they travel along channel 60. It is to be appreciated, as can be seen in FIGS. 1 and 2, that left and right cable fasteners 40, 42 must be of sufficient length to at least partially overlap one another during travel within channel 60 to ensure that right cable fastener 42 is supported by left cable fastener 40.

Figure 3:
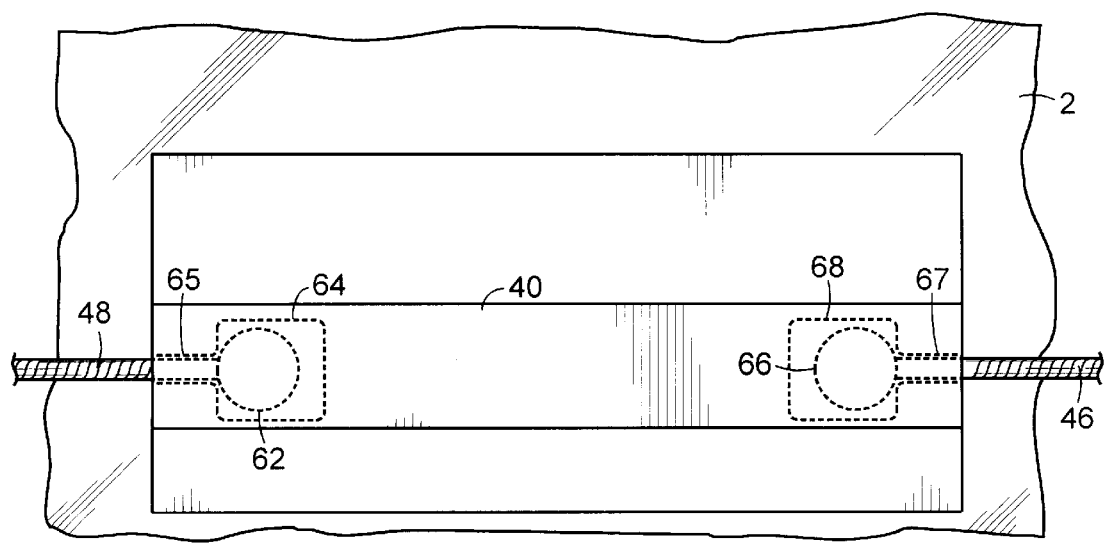
FIG. 3 is a schematic elevation view of a cable fastener of the embodiment of FIG. 1 shown fastened to a sliding pane.

In a preferred embodiment shown in FIG. 3, second exterior segment 48 and interior segment 46 are secured to the left and right sides, respectively, of left cable fastener 40. Second exterior segment 48 passes through cable access way 65 with end 62 of second exterior segment 48 being contained within socket 64 of left cable fastener 40, proximate the left side thereof. End 62 is typically a ball formed on the end of second exterior segment 48. Interior segment 46 passes through cable access way 67 with end 66 of interior segment 46 (typically a ball similar to end 62) being contained within socket 68 of left cable fastener 40, proximate the right side thereof. First exterior segment 44 and interior segment 46 are fastened to right cable fastener 42 in a similar manner with corresponding ends contained within corresponding sockets.

Figure 1A:
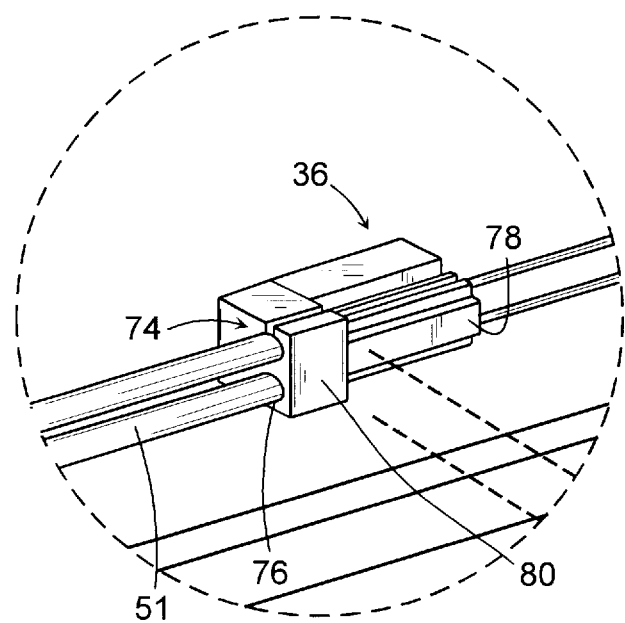
FIG. 1A is an enlarged schematic perspective view of the left cable guide of FIG. 1.

The construction of left cable guide 36 can be seen more clearly in FIGS. 4 and 5. Conduit 50 and 51 carry exterior segments 44 and 48, respectively from drive drum 30 to left cable guide 36. Sockets 70 and 72 formed in left cable guide 36 receive ends of conduit 50 and 51, respectively. Slots 74 and 76 extend from sockets 70 and 72, respectively, to the right edge of left cable guide 36. First exterior segment 44 travels freely through left cable guide 36 within slot 74 and second exterior segment 48 travels freely through left cable guide 36 within slot 76 (see FIG. 1A). Right portion 78 of left cable guide 36 has a profile which is formed to mate with the interior of channel 60 (as seen in FIG. 2.) When assembled, right portion 78 is inserted into channel 60, thereby leaving cap 80 of left cable guide exposed (as seen in FIG. 1). In this manner, left cable guide 36 acts as an end cap on the left side of channel 60. Left cable guide 36 can be any manufacture which ensures that first and second exterior segments 44, and 48 of drive cable 32 are properly routed into cable housing 34 so that they can be attached to left and right cable fasteners 40, 42 at a proper position to prevent entanglement and/or disruption of their respective paths of travel.

Figure 1B:
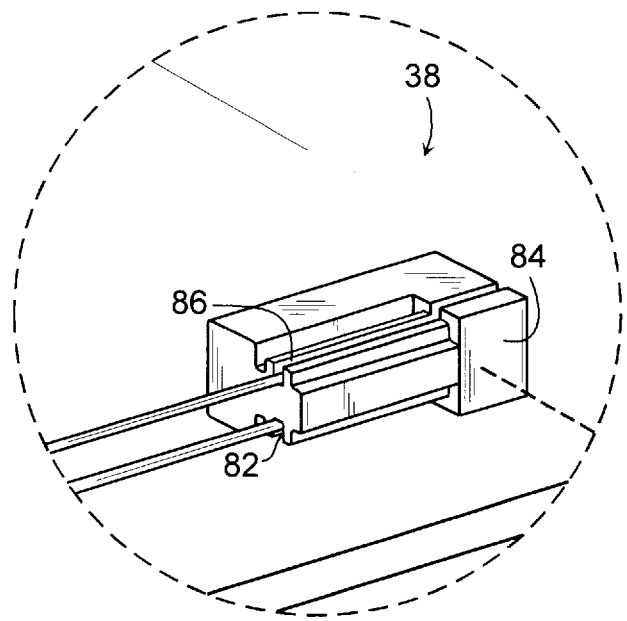
FIG. 1B is an enlarged schematic perspective view of the right cable guide of FIG. 1.

The construction of right cable guide 38 can be seen more clearly in FIGS. 6 and 7. Left portion 82 of right cable guide 38 has a profile formed to mate with the interior of channel 60 (seen in FIG. 2), in a manner similar to right portion 78 of left cable guide 36. When assembled, left portion 82 is inserted into channel 60, thereby leaving cap 84 of right cable guide 38 exposed. In this manner, right cable guide 38 acts as an end cap on the right side of channel 60. Upper slot 86 is formed in an upper portion of right cable guide 38, extending from the left side of right cable guide 38 to semicircular portion 88, formed in cap 84. Lower slot 89 is formed in a lower portion of right cable guide 38, extending from the left side of right cable guide 38 to semicircular portion 88. Upper slot 86, semicircular portion 88 and lower slot 89 form a path along which interior cable segment 46 travels, thereby allowing cable segment 46 to reverse its direction (see FIG. 1B). Right cable guide 38 can be of any manufacture which will allow interior segment 46 to be routed from the right side of right cable fastener 42 to the right side of left cable fastener 40.

Weather sealing can be provided at the upper and lower horizontal edges of sliding panes 2 and 4 in accordance with known techniques including, for example, the use of blade seals affixed to the frame 10, etc. As can be seen in FIG. 8, sliding panes 2 and 4 are positioned substantially parallel to and proximate fixed panes 6, and 8, such that exterior surfaces 91, 93 of sliding panes 2, 4, respectively, are slightly offset from the interior surfaces 95, 97 of fixed panes 6, 8, respectively, while the sliding panes are being opened and closed. In accordance with one preferred embodiment, weather sealing along the left-side vertical edge of sliding pane 2 and right-side vertical edge of sliding pane 4 are provided by O-seals. Specifically, a sealing flange 90 extends vertically along the right edge of fixed pane 6. A left O-seal 92 is adhesively or otherwise affixed vertically to the interior surface of flange 90 such that it is partially compressed between fixed pane 6 and sliding pane 2. Similarly, another vertically-extending sealing flange 94 extends vertically along the left edge of fixed pane 8. A right O-seal 96 is adhesively or otherwise affixed vertically to the interior surface of flange 94 such that it is partially compressed between fixed pane 8 and sliding pane 4. An O-seal typically is provided as a length of resilient material having a round or oval cross section with an open center.

Weather sealing between sliding panes 2 and 4 is provided by sealing flange 98 which extends vertically along the right edge of sliding pane 2 while sealing flange 100, having recess 102 formed therein, extends vertically along the left edge of sliding pane 4. Seal member 104 extends vertically along flange 100 and is formed to matingly engage in recess 102. Projection 106 formed on the right edge of flange 98 engages with groove 108 formed in seal member 104 such that flange 98 and seal member 104 matingly engage to form a weather tight seal when sliding panes 2 and 4 are in their closed positions.

In another preferred embodiment, shown in FIG. 9, the seal between the fixed and sliding panes can be provided with a blade seal. Flange 110 can be provided in place of flange 90 along the right side edge of fixed pane 6, carrying blade seal 112. Blade seal 112 preferably is an extruded or otherwise molded member formed of natural or synthetic rubber, EPDM or other suitable material. Preferably its surface 114 which forms sealing contact with sliding pane 2 is flocked in accordance with known techniques, to improve sliding contact as the sliding pane moves into and out of its closed position. The blade seal 112 can be mounted to the flange 110 in any suitable manner, including adhesively. In the preferred embodiment shown, blade seal 112 includes flanged mounting base 116 which slips into a correspondingly shaped recess in flange 110. A similar flange and corresponding blade seal (not shown) are provided along fixed pane 8. This arrangement is found to provide ease of assembly and replacement. Alternative sealing materials and techniques will be readily apparent to those skilled in the art in view of the present disclosure.

An alternative embodiment of mounting drive cable 32 to the window assembly 1 is shown in FIG. 10. In this embodiment, drive cable 32 is bonded directly to sliding pane 2 with epoxy or other adhesive 118 and in like fashion, drive cable 32 is bonded directly to sliding pane 4. Since drive cable 32 is bonded directly to the sliding panes 2, 4, cable fasteners 40 and 42 are not required.

In accordance with certain preferred embodiments, the window construction further includes a sensor to detect an obstruction encountered by the slider pane as it moves toward its closed or open position. Upon detecting an obstruction, the drive motor responds to a control signal initiated by the sensor to stop or reverse the travel direction of the slider pane. Such sensor can be provided as an electronic sensor incorporated into the electric motor to monitor the motor's amperage draw. In the preferred pull-pull cable arrangements described here, there is substantially constant load on the motor in both directions, that is, in the opening and closing direction of the slider pane during normal unobstructed operation. Hence, a sensor and associated actuator can be set to stop or reverse motor direction upon detecting amperage draw exceeding a preselected limit, for example, plus or minus 0.5 amps from a 2.0 amp design value. In this regard, it is a significant advantage of the pull-pull type and drum drive assembly disclosed here, that considerable drive force can be carried easily by the drive cable. The driving portion of the cable is always in tension, rather than being in compression when either opening or closing the sliding pane, as in a push-pull mechanism. Thus, the pull-pull arrangement disclosed here can be designed for constant load or force in both directions, with reduced concern for cable buckling limits.

Figure 11:
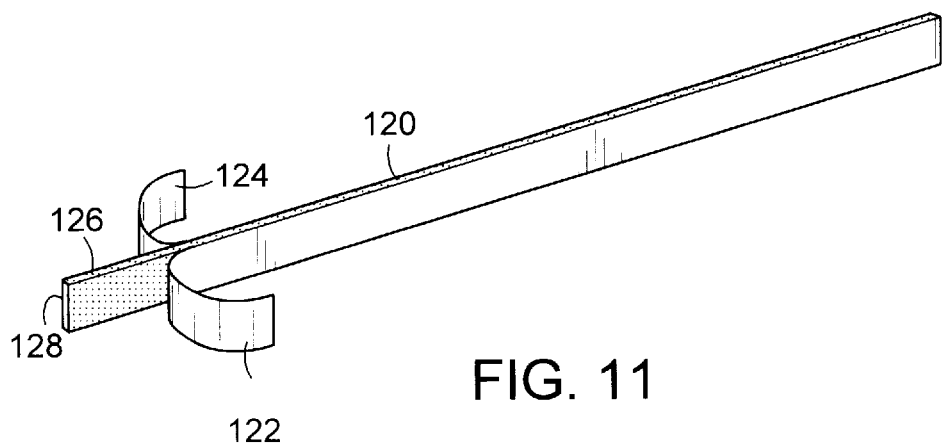
FIG. 11 is a perspective view of a dual sided adhesive tape used in a method of retrofitting manually operated sliding pane windows.

Another preferred embodiment is illustrated in FIG. 11, which provides for the retrofitting of an existing manual sliding dual pane window assembly to a remotely powered version. Dual-sided adhesive tape 120 is provided for securing cable guides 36, 38 and cable fasteners 40, 42 to their respective panes. Removable film strips 122 and 124 are provided to protect the adhesive on surfaces 126 and 128 of tape 120 until such time as the guides and fasteners are to be attached to the panes. In use, for example, film strip 122 is pulled from tape 120 and tape 120 is placed on a rear surface of left cable fastener 40. The other film strip 124 is removed and left cable fastener 40 is then secured to sliding pane 2 by placing surface 128, having adhesive thereon, onto sliding pane 2. In like manner, right cable fastener 42 and the cable guides are secured to their respective panes. Additionally, a drive motor and drive drum are provided for mounting to the motor vehicle body at a location remote from the window assembly, preferably at a location below the seat level of the occupants.

Figure 12:
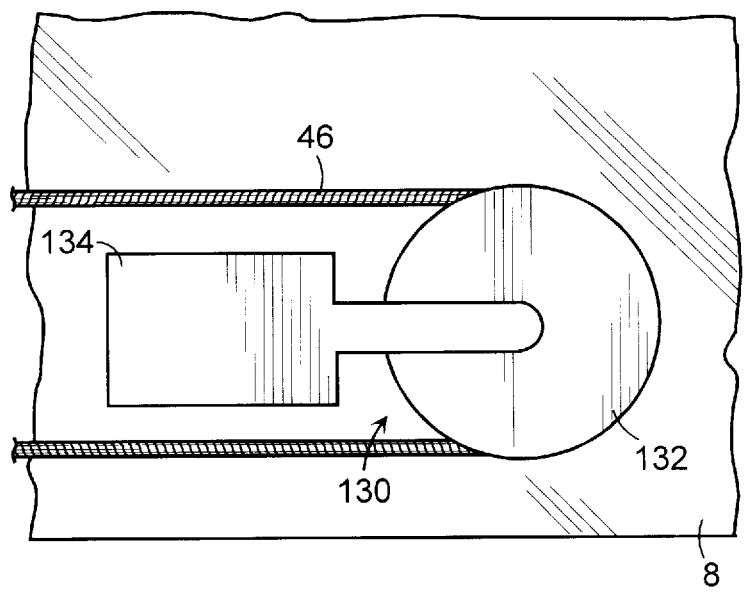
FIG. 12 is a schematic elevation view of an alternative embodiment of the right cable guide of FIG. 1.

Another preferred embodiment of a right cable guide comprising pulley 130 is shown in FIG. 12. Pulley 130 comprises wheel 132 and base 134, to which wheel 132 is rotatably secured. Base 134 is secured to fixed pane 8, preferably with an epoxy or adhesive. Interior segment 46 is wrapped around wheel 132 such that its direction is reversed and it can properly operate to open and close sliding panes 2 and 4.

Figure 14:
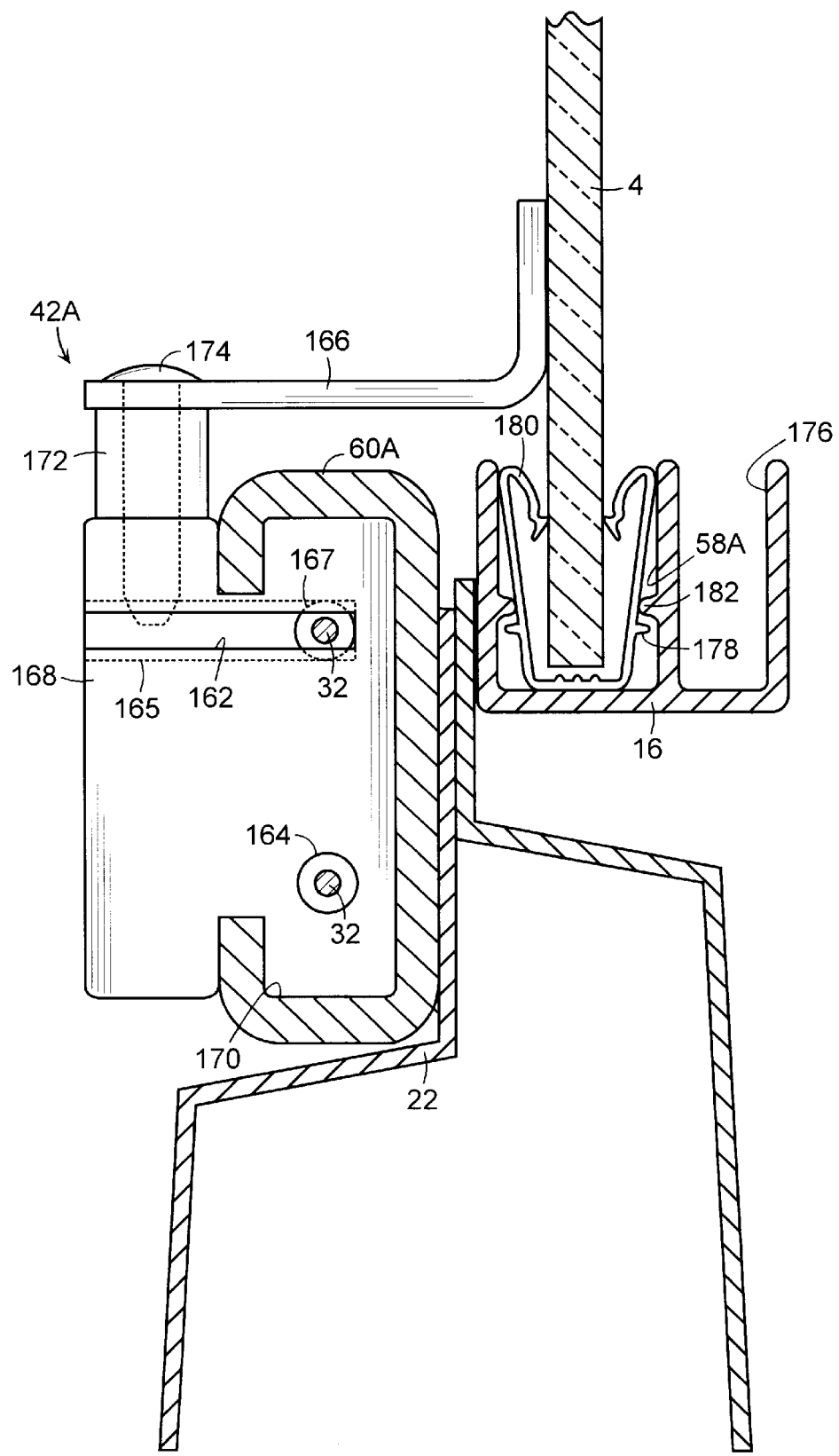
FIG. 14 is a schematic section view taken along line 14—14 of FIG. 13.

Another preferred embodiment of the modular window assembly 1 is shown partially in FIG. 13 with sliding panes 2 and 4 shown in an open position. C-shaped channel member 60A is secured to vehicle body 22 (as seen in FIG. 14) with the open side of its C-shape facing away from window assembly 1. In this embodiment drive cable 32 is preferably formed of one continuous length of cable. Left cable guide 36A is formed on the left end of channel member 60A. Sockets 70A and 72A are formed in left cable guide 36A to receive conduit 50 and 51, respectively. Through bores 152, 154 extend from sockets 70A, 72A, respectively through left cable guide 36A into the open portion of channel member 60A and allow drive cable 32 to pass therethrough. Right cable guide 38A comprises a semi-circular portion 156 formed on the right end of channel member 60A having pulley 132 secured thereto. Left cable fastener 40A is secured to left sliding pane 2 and right cable fastener 42A is secured to right sliding pane 4. Left aperture 158 extends through an upper portion of left cable fastener 40A to allow drive cable 32 to pass freely therethrough. Left slot 160 extends along a lower portion of left cable guide 40A with left socket 161 formed in a central portion of left slot 160. Left stop means 163 is secured to drive cable 32 such that drive cable 32 rests within left slot 160 and left stop means 163 rests within left socket 161 thereby fixing drive cable 32 to left cable fastener 40A. Right slot 162 extends along an upper portion of right cable guide 42A with right socket 165 formed in a central portion of right slot 162. Right stop means 167 is secured to drive cable 32 such that drive cable 32 rests within right slot 162 and right stop means 167 rests within right socket 165 thereby fixing drive cable 32 to right cable fastener 42A. Right aperture 164 extends through a lower portion of right cable fastener 42A to allow drive cable 32 to pass freely therethrough. A guide member or tab 171 is provided on a lower portion of channel member 60A proximate pulley 132. Tab 171 is positioned such that drive cable 32 rides along tab 171 as it wraps around pulley 132 and travels back to right sliding guide 42A, thereby aligning drive cable 32 with right aperture 164. Left and right stop means 163, 167 may be balls or metallic spheres crimped onto drive cable 32 or any other suitable means which are securely fastened to drive cable 32 and which will rest within left and right sockets 161, 163, thereby securing drive cable 32 to the left and right cable fasteners 40A, 42A.

An embodiment of cable fastener 42A of FIG. 13 used in retrofitting an existing window assembly can be more clearly seen in FIG. 14. Channel member 60 A is secured to vehicle body 22 by any known securing means (not shown), such as screws, which will be apparent to those skilled in the art given the benefit of this disclosure. A securing means comprising an L shaped bracket 166 is secured to sliding pane 4. Bracket 166 may be bonded or secured by other means to sliding pane 4. Right sliding guide 168 is formed to mate with channel member 60A such that it can slide along the recess 170 formed within channel member 60A. Right slot 162 is formed on the outward facing surface of an upper portion of right sliding guide 168 and contains drive cable 32. Right stop means 167 is formed on drive cable 32 and rests within right socket 165 which is formed in a central portion of right slot 162. Right socket 165 contains right stop means 167 and thereby secures drive cable 32 to right cable fastener 42A. Right aperture 164 is formed in a lower portion of sliding guide to allow drive cable 32 to pass freely therethrough. Spacer 172 is positioned between bracket 166 and right sliding guide 168, screw 174 extends through spacer 172 and is threaded into right sliding guide 168, thereby fastening bracket 166 to right sliding guide 168. A lower edge of sliding pane 4 is received in channel 58A of lower frame member 16A. Channel 176 is also provided in lower frame member 16A to receive fixed pane 8 (not shown). Clips 180, which retain sliding pane 4 within channel 58A, have tabs 178 formed on outer surfaces thereof. Projections 182, formed on the inner walls of channel 58A, engage tabs 178 to retain clips 180 within channel 58A. Left sliding guide 169 (seen in FIG. 13 is formed in a manner similar to right sliding guide 168 and has similar componentry in order to form left cable fastener 40A.

Figure 15:
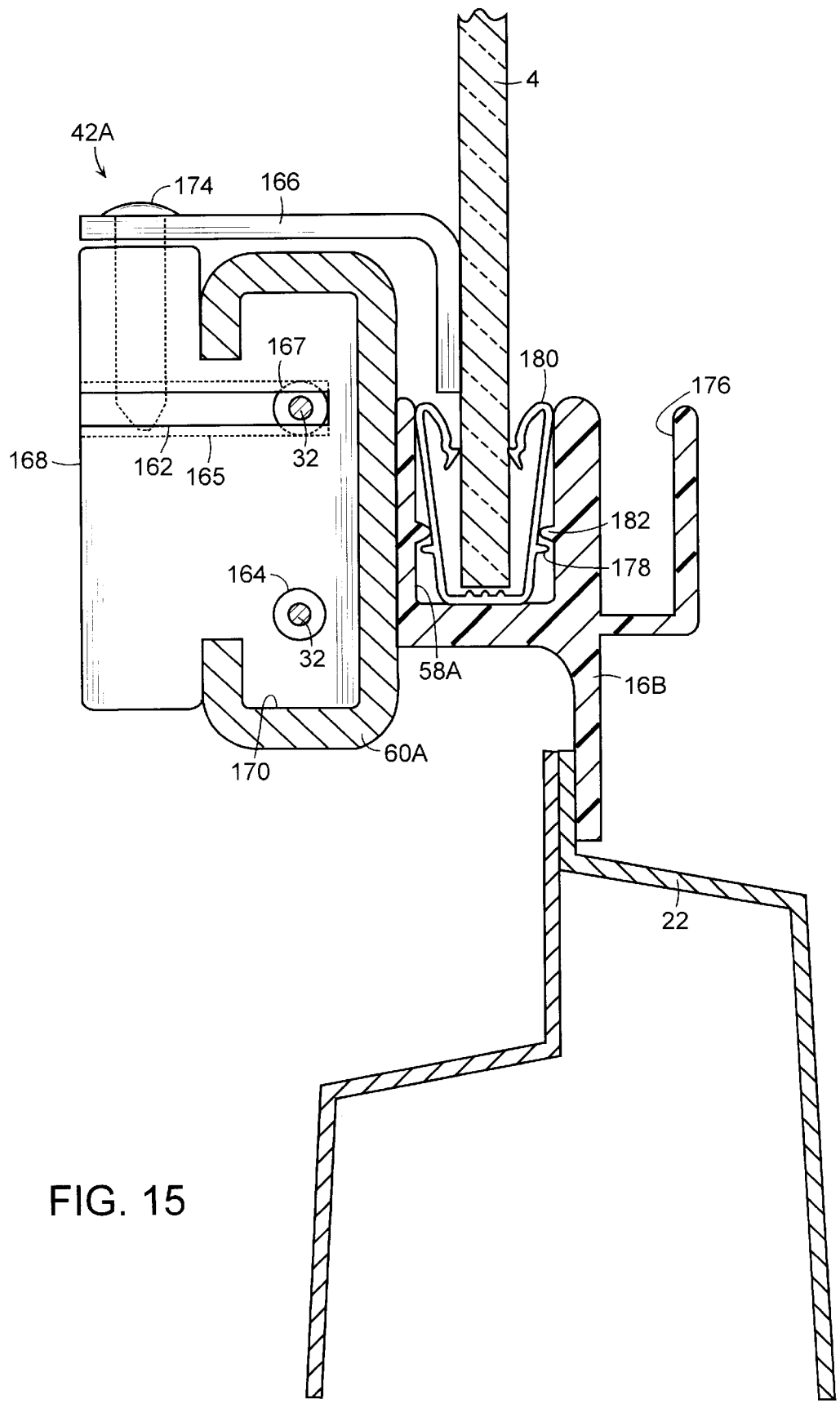
FIG. 15 is an alternative embodiment of the channel member and right cable guide of FIG. 14.

An alternative embodiment of right cable fastener 42A, typically used in a new installation, is shown in FIG. 15. Channel member 60A is secured directly to lower frame member 16B. The window assembly is then mounted to the vehicle as lower frame member 16B is secured directly to vehicle body 22. In this embodiment, bracket 166 is secured to sliding pane 4 by bonding, or other suitable means, and fastened directly to right sliding guide 168, typically with screw 174, having no spacer between bracket 166 and right sliding guide 168.

In light of the foregoing disclosure of the invention and description of certain preferred embodiments, those who are skilled in this area of technology will readily understand that various modifications and adaptations can be made without departing from the true scope and spirit of the invention. All such modifications and adaptations are intended to be covered by the following claims.

We claim:

1. A modular window assembly mounted in a motor vehicle body comprising, in combination:
   a circumferential frame member mounted in a window recess in the vehicle body;
   a sliding subassembly comprising first and second sliding panes mounted in the frame member between first and second fixed panes, the sliding panes being slideable laterally back and forth between respective open and closed positions;
   a drive subassembly to move the sliding panes laterally back and forth between their open and closed positions, the drive subassembly comprising a drive motor having an output member and a drive drum operatively engaging the output member for rotation upon actuation of the drive motor; and
   a drive member operatively connecting the drive subassembly to the sliding panes, the drive member comprising a drive cable wrapped around the drive drum for pulling the sliding panes toward their open positions upon rotation of the drive drum in a first rotational direction, and for pulling the sliding panes toward their closed positions upon rotation of the drive drum in an opposite rotational direction;
   wherein the sliding subassembly further comprises a first cable guide operably connected to the first fixed pane, a second cable guide operably connected to the second fixed pane, a first cable fastener secured to the first sliding pane, and a second cable fastener secured to the second sliding pane, the sliding subassembly and drive cable forming a closed loop, with the drive cable extending from the drive drum to the second cable fastener through the first cable guide, from the second cable fastener to the first cable fastener through the second cable guide, and from the first cable fastener to the drive drum through the first cable guide.

2. The modular window assembly in accordance with claim 1 wherein the first cable fastener is secured to the first sliding pane proximate a lower edge of the first sliding pane, the second cable fastener is secured to the second sliding pane proximate a lower edge thereof, first cable guide is proximate a lower edge of the first fixed pane, and the second cable guide is proximate a lower edge of the second fixed pane.

3. The modular window assembly in accordance with claim 1 wherein the first and second cable fasteners each comprise a pair of sockets formed in respective ends thereof to hold respective cable ends formed on the drive cable.

4. The modular window assembly in accordance with claim 1 wherein tensioning means are provided on the drive cable for adjusting the tension in the drive cable.

5. The modular window assembly in accordance with claim 4 wherein the tensioning means are located proximate the drive drum and portions of the drive cable extending from the tensioning means to the first cable guide are enclosed in a conduit.

6. The modular window assembly in accordance with claim 5 wherein the first cable guide has a pair of sockets formed therein to releasably hold corresponding ends of the conduit enclosing the drive cable.

7. The modular window assembly in accordance with claim 1 wherein the sliding subassembly further comprises a channel member, the first and second cable guides being matingly engaged with first and second ends of the channel member, respectively, the first and second cable fasteners being slidingly engageable within a recess of the channel member such that the sliding panes move laterally between their open and closed positions as the cable fasteners slide laterally left and right within the recess.

8. A modular window assembly mounted in a motor vehicle body comprising, in combination:
   a circumferential frame member mounted in a window recess in the vehicle body;
   a sliding subassembly comprising first and second sliding panes mounted in the frame member between first and second fixed panes, the sliding panes sliding laterally back and forth between their open positions and their closed positions; and
   a pull-pull cable drive subassembly for moving the sliding panes laterally back and forth between their open and closed positions, the pull-pull cable drive subassembly comprising:
      a drive apparatus mounted to the vehicle body remote from the frame member, comprising a drive motor having an output member and a drive drum operatively engaging the output member for rotation upon actuation of the drive motor; and
      a drive cable attached to the sliding subassembly and wrapped around the drive drum for pulling the sliding panes substantially laterally toward their open positions upon rotation of the drive drum in a first rotational direction, and for pulling the sliding panes substantially laterally toward their closed positions upon rotation of the drive drum in the opposite rotational direction;
   wherein the sliding subassembly further comprises a first cable guide operably connected to the first fixed pane, a second cable guide operably connected to the second fixed pane, a first cable fastener secured to the first sliding pane, and a second cable fastener secured to the second sliding pane, the sliding subassembly and drive cable forming a closed loop, with the drive cable extending from the drive drum to the second cable fastener through the first cable guide, from the second cable fastener to the first cable fastener through the second cable guide, and from the first cable fastener to the drive drum through the first cable guide.

9. The modular window assembly in accordance with claim 8 wherein the second cable guide comprises a substantially semicircular portion to receive the drive cable extending from the first cable fastener proximate a lower portion of the second cable guide and return the drive cable to the second cable fastener proximate an upper portion of the second cable guide.

10. The modular window assembly in accordance with claim 8 wherein the sliding subassembly further comprises a channel member, the first and second cable guides being matingly engaged with first and second ends of the channel member, respectively, the first and second cable fasteners being slidingly engageable within a recess of the channel member such that the sliding panes move laterally between their open and closed positions as the cable fasteners slide laterally left and right within the recess.

11. The modular window assembly in accordance with claim 8 wherein the sliding panes are substantially quadrilateral, having substantially frameless lower edges extending between first and second lower corners of the sliding panes and substantially frameless upper edges extending between first and second upper corners of the sliding panes, the lower and upper edges being slidingly received in laterally extending sliding travel channels in lower and upper portions of the frame member, respectively.

12. The modular window assembly in accordance with claim 8 further comprising sealing means for providing a substantially weather-tight seal between the sliding panes in their closed positions and the fixed panes.

13. The modular window assembly in accordance with claim 12 wherein the sealing means comprises O-seals extending on inside surfaces of the fixed panes proximate their peripheral edges adjacent the sliding panes, the sliding panes at least partially compressing the O-seals.

14. The modular window assembly in accordance with claim 12 wherein the sealing means comprises blade seals extending on inside surfaces of the fixed panes proximate their peripheral edges adjacent the sliding panes, the sliding panes at least partially compressing the blade seal.

15. The modular window assembly in accordance with claim 8 further comprising sealing means for providing a substantially weather-tight seal between the sliding panes in their closed positions.

16. The modular window assembly in accordance with claim 15 wherein the sealing means comprises a first side flange extending on a second side vertical edge of the second sliding pane, a second side flange extending on a first side vertical edge of the first sliding pane, and a seal member extending along the second side flange, the sliding panes at least partially compressing the seal member when the sliding panes are in their closed positions.

17. The modular window assembly in accordance with claim 8 wherein the second cable fastener comprises a pulley.

18. The modular window assembly in accordance with claim 8 wherein the sliding subassembly further comprises a channel member secured to the frame member, the first cable guide being matingly engaged with a first end thereof and the second cable guide being matingly engaged with a second end thereof, the first and second cable fasteners being slidingly engageable within a recess of the channel member such that the sliding panes move laterally between their open and closed positions as the cable fasteners slide laterally left and right within the recess.

19. The modular window assembly in accordance with claim 18 wherein the first and second cable fasteners comprise first and second securing means secured to the first and second sliding panes, respectively, and first and second sliding guides secured to the first and second securing means, respectively, the first and second sliding guides being slidingly engageable within a recess of the channel member such that the sliding panes move laterally between their open and closed positions as the cable fasteners slide laterally left and right within the recess.

20. The modular window assembly in accordance with claim 19 wherein the first and second securing means comprise L shaped brackets secured at first ends thereof to the first and second sliding panes, respectively, and at second ends thereof to the first and second sliding guides, respectively.

21. The modular window assembly in accordance with claim 19 wherein the first and second sliding guides have apertures formed therein through which the drive cable passes.

22. The modular window assembly in accordance with claim 19 further comprising:
first and second cable stops formed on the drive cable;
first and second apertures formed in the first and second sliding guides, respectively;
first and second sockets formed in central portions of the first and second apertures, respectively, to receive the fastening means.

23. The modular window assembly in accordance with claim 22 wherein the cable stops comprise balls to be received by the sockets.

24. The modular window assembly in accordance with claim 18 further comprising conduit enclosing the drive cable between the drive drum and the sliding subassembly, wherein the first cable guide comprises first and second through bores formed therein to allow the drive cable to pass therethrough and first and second sockets to receive the conduit enclosing the drive cable.

25. The modular window assembly in accordance with claim 18 wherein the second cable guide comprises a pulley rotatably secured to the channel member.

26. The modular window assembly in accordance with claim 25 further comprising a guide member proximate the pulley, the guide member positioning the cable between the pulley and the second cable fastener.

27. The modular window assembly in accordance with claim 26 wherein the guide member comprises a tab formed on a lower portion of the channel member, the drive cable riding along a surface of the tab and being aligned between the pulley and the second cable fastener.

28. The modular window assembly in accordance with claim 8 further comprising an electrical switch operably connected to the drive motor and suitable for mounting in the motor vehicle remote from the frame member and from the drive subassembly.

29. The modular window assembly in accordance with claim 8 wherein the sliding subassembly further comprises:
a channel member secured to the vehicle body, the first cable guide on a first end thereof and the second cable guide on a second end thereof; the first and second cable fasteners being slidingly engageable within a recess of the channel member such that the sliding panes move laterally between their open and closed positions as the cable fasteners slide laterally left and right within the recess.

30. A modular window assembly mounted in a motor vehicle body comprising, in combination:

a circumferential frame member mounted in a window recess in the vehicle body;

a sliding subassembly comprising first and second sliding panes mounted in the frame member between first and second fixed panes, the sliding panes sliding laterally back and forth between their open positions and their closed positions; and a pull-pull cable drive subassembly for moving the sliding panes laterally back and forth between their open and closed positions, the pull-pull cable drive subassembly comprising:

a drive apparatus mounted to the vehicle body remote from the frame member, comprising a drive motor having an output member and a drive drum operatively engaging the output member for rotation upon actuation of the drive motor; and a drive cable attached to the sliding subassembly and wrapped around the drive drum for pulling the sliding panes substantially laterally toward their open positions upon rotation of the drive drum in a first rotational direction, and for pulling the sliding panes substantially laterally toward their closed positions upon rotation of the drive drum in the opposite rotational direction wherein the sliding subassembly further comprises a first cable guide operably connected to the first fixed pane, a second cable guide operably connected to the second fixed pane, the sliding subassembly and drive cable forming a closed loop, with the drive cable extending from the drive drum, through the first cable guide, along the second sliding pane to which the drive cable is directly bonded, through the second cable guide and back along the first sliding pane to which the drive cable is directly bonded, and then through the first cable guide back to the drive drum.

* * * * *